Patented Sept. 17, 1929

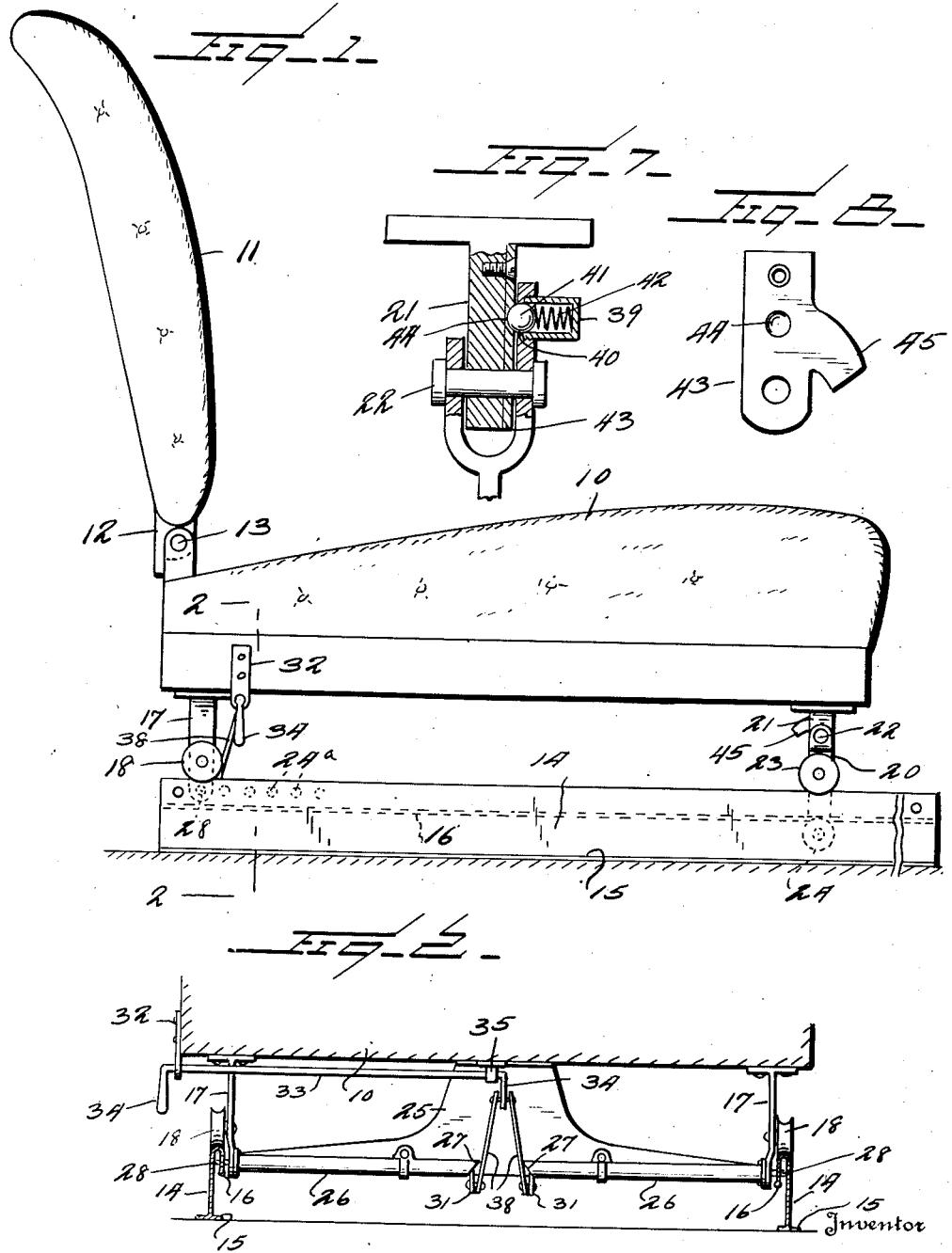

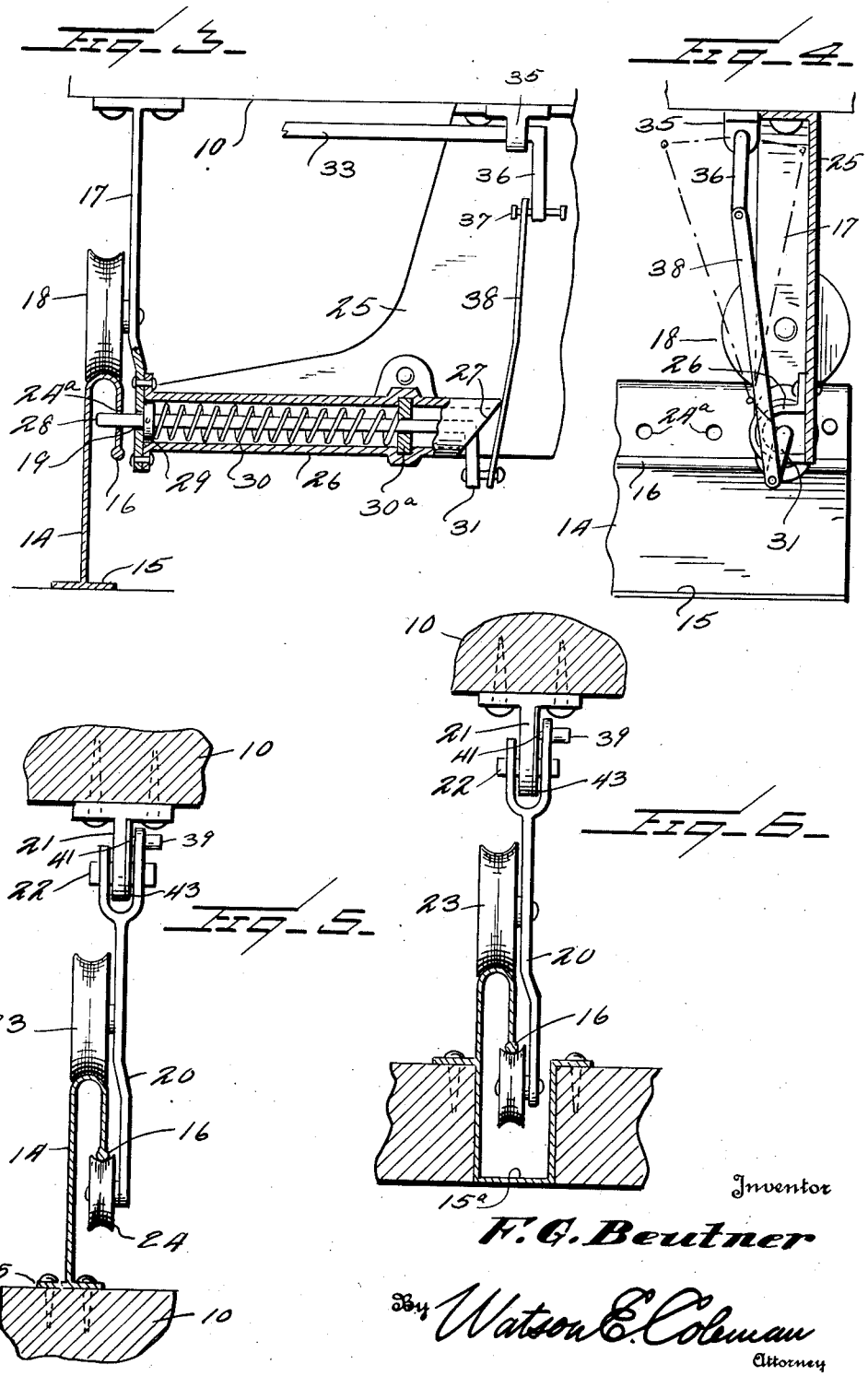

1,728,655

UNITED STATES PATENT OFFICE

FRED G. BEUTNER, OF WHITE LAKE, SOUTH DAKOTA

SLIDING SEAT FOR AUTOMOBILES

Application filed January 26, 1928. Serial No. 249,646.

This invention relates to seats for automobiles and particularly to a sliding seat, the general object of the invention being to provide a seat which is so constructed that a passenger can slide the seat forward or rearward while sitting therein to thus allow passengers from a back seat to get out of the car or into the car.

A further object is to so construct the seat that it can be locked in any desired position so that the occupant of the seat may adjust the seat to suit himself.

Another object is to provide means for locking the seat in its adjusted position which is readily releasable by the driver and which cannot become accidentally unlatched.

Other objects will appear in the course of the following description.

My invention is illustrated in the accompanying drawings, wherein:—

Figure 1 is a view in side elevation of an automobile seat constructed in accordance with my invention;

Figure 2 is a front elevation of the supporting means and lock for the rear of the seat;

Figure 3 is a transverse sectional view through the front hanger, the locking means and a track;

Figure 4 is a side elevation of the structure shown in Figure 3;

Figures 5 and 6 are vertical sectional views through two forms of track and showing the front hanger in elevation.

Figure 7 is a vertical sectional view through one of the forward brackets and through the latching device for the forward link or leg;

Figure 8 is a side elevation of the socket plate mounted upon the bracket shown in Figure 7.

Referring to these drawings, 10 designates a seat of the usual form, which seat may be either for the back or front of the vehicle and may be used either as a driver's seat or for a passenger sitting on the right hand side of the driver. The seat is illustrated as being provided with a back 11 having downwardly depending ears 12 pivoted at 13 to the rear portion of the seat so that the back may be turned either up or down. I do not wish to be limited to this construction however.

Mounted upon the floor of the car is a track 14. Two forms of this track may be used, one of these forms, as illustrated in Figure 5, having a base 15 for attachment to the floor of the car and extending straight upward from the base and then upward and laterally and then downward. The downward extension is provided with a bead 16 at its lower edge.

Attached to the bottom of the seat at the rear thereof on each side is a depending hanger 17. This hanger being provided between its point of attachment and the lower end of the hanger with the laterally disposed roller 18 which is adapted to engage with the upper edge of the track and roll thereon. The lower end of this hanger is provided with an opening 19 through which the locking bolt to be hereinafter described is projected. The forward hanger is designated 20 and this hanger at its upper end is bifurcated and pivotally connected with a depending ear 21 having a base which is bolted or otherwise attached to the bottom of the seat. The pivot bolt is designated 22. This hanger carries upon it a laterally projecting roller 23 which bears upon the top of the track and at its lower end carries the laterally projecting roller 24 which bears upward against the bead 16. This hanger is supported upon the track at two points. This construction is such as to permit the seat to be tipped upward upon the pivot 22 whenever desired but at the same time when the seat is down it permits the seat to be shifted longitudinally along a track.

The track 14 is provided in its web with a plurality of openings 24 with which bolts mounted on the seat support engage. As shown in Figure 3 disposed beneath the seat 10 is a seat supporting member 25 which extends laterally and nearly to the tracks 14, this seat supporting member being formed on its side face with the two laterally disposed tubular chambers 26. The inner ends of these chambers are upwardly and inwardly inclined, as at 27. Disposed within these chambers are the longitudinally shiftable bolts 28, each bolt having a collar 29 adjacent its forward end and a spring 30 which bears against this collar at one end and spring retaining seat 30ª at the other. The inner end of each bolt 29 is angularly bent, as at 31. Extending longitudinally beneath the seat and supported in a hanger or bracket 32 is a shaft 33 having a handle 34 at its outer end. This shaft at its inner end is fastened to a bearing 35 in its crank arm, as at 36; this crank being pivoted by a bolt 37 to two links 38. These links 38 at their lower ends are pivotally connected to the angular ends 31 of the bolts 28. It is to be obvious now that when the shaft 33 is turned in one direction by the handle 34 these angular ends 31 will bear against the angular faces 27 at the inner ends of the bolt chambers and the elevation of the angular ends 31 will cause the beveled faces 25 to force the bolts inward, a reverse movement will permit the springs 30 to project the bolts. When the bolts are forced outward they will enter the apertures in the track and will lock the seat in its adjusted position.

For the purpose of normally holding the forward hanger 20 in a position depending straight downward from the bracket 21 so that this hanger will not turn upon its pivot when weight is placed upon the seat, I mount upon one arm of the bifurcated upper end of the hanger a tubular casing 39, the inner end of the casing being screw-threaded to engage the screw-threaded seat formed in the outer arm of the hanger. This seat is also formed with a smaller opening 40, and disposed within the casing is a ball 41 which normally projects through said opening but cannot pass entirely through the opening, this ball being projected by means of a spring 42.

Attached to the face of the bracket 21 is a steel face plate 43, shown in Figure 7, and when the hanger is in a vertical position the ball 41 will enter a depression 44 formed in the plate 43. Of course, this depression might be formed in the bracket itself, but I prefer to provide a steel plate with a depression 44 formed therein so as to eliminate wear as much as possible. The bracket is also formed with an arcuate prolongation 45 upon which the ball 41 may travel in approaching or moving away from the seat or socket 44. If it be desired to tilt the seat forward, the rear lock previously described is disengaged and then the rear of the seat is pulled upward, which will cause the automatic lock formed by the ball 41 in the front hanger to release and allow the seat to be tipped forward. When the seat is tilted back in riding position, the ball will once more enter its seat or socket 44 and the forward hanger will be held firmly in a vertical position so that the seat can be shifted backward or forward.

A seat constructed in accordance with my invention is particularly desirable for use as the front seat of an automobile as it permits the occupant of this front seat to sit back in an uncramped position under ordinary riding circumstances but to shift the seat forward whenever an occupant of a rear seat wishes to get out of the machine. This is particularly adapted for small automobiles where the front seat under ordinary circumstances constitutes an impediment to persons passing from the rear of the car out of the fore door. The seat may also be used as a driver's seat and has exactly the same advantages as previously stated, coupled, however, with the advantage that the seat may be adjusted to suit the height of the driver so that the seat may be brought forward for a short person or shifted rearward for a relatively tall person and adapted to be shifted rearward or forward to permit a person to leave the car or to permit others to leave the car with convenience.

It will be seen that the locking device is positive in its action and is very readily operated, that it is entirely concealed and there are no parts, except the lever handle 34, which in any way project out beyond the lines of the ordinary seat.

I do not wish to be limited to the use of the particular form of track illustrated in Figure 5, inasmuch as a track of the form shown in Figure 6 might be used, this track having a base portion 15ª insertible into a groove or recess having flanges through which bolts, screws or other attaching means may pass, and then extending upward and then downward in precisely the same manner as the device previously described. Under the last named circumstances, the track will extend above the floor about three-fourths of an inch, whereas if the track shown in Figure 5 is used it will extend above the floor about one and three-fourths of an inch.

While I have illustrated certain details of construction and arrangement of parts which I believe to be particularly effective for the purpose intended, I do not wish to be limited to this as it is obvious many changes might be made without departing from the spirit of the invention as defined in the appended claims.

I claim:—

1. In an automobile, two parallel tracks, a seat, a pair of track engaging members pivotally connected to each other, the upper member being rigidly engaged with the forward end of the seat whereby the seat may be tilted upon the lower member, the lower track engaging member having rollers engaging the track and holding it in a vertical position, hangers depending from the rear portion of the seat and having rollers engaging said track, and means for locking the seat in any longitudinally adjusted position upon the track.

2. In an automobile, two parallel tracks each having a downwardly turned portion, a seat, hangers pivotally mounted upon the forward end of the seat, each hanger having two rollers one bearing against the upper edge of the corresponding track and the other bearing against the edge of the downwardly turned portion to thus hold the hanger from upward movement, hangers depending from the rear of the seat, each hanger carrying a roller, and bolts mounted upon the rear hangers, the tracks having perforations into which said bolts may engage, means for projecting the bolts into said perforations, and manually operable means mounted upon one end of the seat whereby the bolts may be retracted.

3. In an automobile, two parallel tracks, a seat, hangers mounted upon the seat, rollers carried by the hangers and engaging with said tracks, the tracks each having a longitudinal series of perforations, longitudinally shiftable bolts mounted below the seat and projectible through said perforations, a rotatable shaft extending beneath the seat at one end thereof and having a handle whereby it may be operated, springs urging the bolt outward, and means connected to said shaft whereby the bolts may be retracted.

4. In an automobile, two parallel tracks, a seat, hangers mounted upon the seat, rollers carried by the hangers and engaging with said tracks, the tracks each having a longitudinal series of perforations, longitudinally shiftable bolts mounted below the seat and projectible through said perforations, springs urging the bolts outward, members having cam faces concentric to the bolts, each bolt having an angular portion adapted to engage against the corresponding cam face, and manually operable means to rotate the bolts to thus cause the angular portions of the bolts to operate against said cam faces and cause the retraction of the bolts.

5. In an automobile, two parallel tracks, a seat, rollers carried by the seat and engaging the tracks, one of the tracks having a longitudinal series of perforations, a tubular member operatively supported from the seat and having its axis in align with the perforations, the inner end of the tubular member being inclined, a bolt passing longitudinally through the tubular member and having an angular rear end adapted to bear against said inclined end of the tubular member when the bolt is rotated, and manually operable means for rotating the bolt to cause its angular portion to bear against the inclined end of the tubular member and retract the bolt.

6. In an automobile, two parallel tracks, a seat, hangers mounted upon the seat and having rollers engaging said tracks, one of the tracks having a longitudinal series of perforations, a tubular member mounted upon the seat and having an inclined inner end, a longitudinally shiftable bolt mounted in the tubular member and adapted to engage the perforations of said track, a spring urging the bolt outward, the bolt having an angular inner end adapted to bear against the angular end of the tubular member when the angular end is lifted, a shaft mounted beneath the seat and having at one end a handle and at the other end a crank, and a connecting rod between said crank and the angular end of the bolt whereby the bolt may be rotated in one direction to cause its retraction and in the other direction to permit its projection.

7. In an automobile, two parallel tracks, a seat, track-engaging members pivotally connected to the forward end of the seat whereby the seat may be tilted, the track-engaging members having rollers engaging the track, means for yieldingly holding the track-engaging members in a vertical position but yieldable to permit the seat to be turned on the pivots of the track-engaging members, hangers depending from the rear portion of the seat and having rollers engaging said track, and means for locking the seat in any longitudinally adjusted position upon the track.

8. In an automobile, two parallel tracks, a seat, brackets depending from the forward end of the seat, track-engaging hangers pivotally connected to the brackets and having rollers engaging the track, each hanger having a spring-projected ball and the corresponding bracket having a socket within which said ball yieldingly engages, hangers depending from the rear portion of the seat and having rollers engaging said track, and means for locking the seat in any longitudinally adjusted position upon the track.

9. In a structure of the character described, two parallel tracks, each track extending upwardly and laterally and then downward to provide an upper track face and a floor confronting track face, a seat having rollers at one end bearing against the upper face of the track, and hangers pivotally connected to the seat and depending therefrom having each a roller bearing against the upper face of the track and a roller bearing against the floor confronting face thereof, whereby the seat may be raised to lift the first-named roller from the track, and turned upon the pivotal connection to the hangers.

In testimony whereof I hereunto affix my signature.

FRED G. BEUTNER.